United States Patent
Shi et al.

(10) Patent No.: US 12,490,254 B2
(45) Date of Patent: Dec. 2, 2025

(54) METHOD AND DEVICE FOR CROSS-CARRIER SCHEDULING PRIMARY CELL

(71) Applicant: ZTE Corporation, Shenzhen (CN)

(72) Inventors: Jing Shi, Shenzhen (CN); Peng Hao, Shenzhen (CN); Xingguang Wei, Shenzhen (CN); Jian Li, Shenzhen (CN); Kai Xiao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 342 days.

(21) Appl. No.: 18/112,535

(22) Filed: Feb. 22, 2023

(65) Prior Publication Data

US 2023/0199752 A1 Jun. 22, 2023

Related U.S. Application Data

(63) Continuation of application No. PCT/CN2020/121142, filed on Oct. 15, 2020.

(51) Int. Cl.
*H04W 72/1263* (2023.01)
*H04W 72/232* (2023.01)

(52) U.S. Cl.
CPC ..... *H04W 72/1263* (2013.01); *H04W 72/232* (2023.01)

(58) Field of Classification Search
CPC ........... H04W 72/1263; H04W 72/232; H04W 72/23; H04W 72/0453; H04L 5/001; H04L 5/0096; H04L 5/0044
See application file for complete search history.

(56) References Cited

U.S. PATENT DOCUMENTS

| 2013/0010720 A1* | 1/2013 | Lohr | ..................... H04W 52/30 |
| | | | 370/329 |
| 2014/0098774 A1* | 4/2014 | Gao | ..................... H04W 72/23 |
| | | | 370/329 |

(Continued)

FOREIGN PATENT DOCUMENTS

| CN | 111132359 A | 5/2020 |
| CN | 111357234 A | 6/2020 |

(Continued)

OTHER PUBLICATIONS

Russian Patent Office Decision to Grant with Translation of the Decision regarding Application No. 2023103829 dated Feb. 1, 2024, 16 gages.

(Continued)

*Primary Examiner* — Hoang-Chuong Q Vu
(74) *Attorney, Agent, or Firm* — Crowell & Moring LLP

(57) ABSTRACT

The present disclosure describes methods, systems and devices for switching cross-carrier scheduling primary cell for a user equipment (UE), wherein a secondary cell is configured to schedule the primary cell. One method includes receiving, by the UE, a downlink control information (DCI) via a physical downlink control channel (PDCCH) from a network base station, the DCI used to switch the cross-carrier scheduling primary cell. Another method includes receiving, by the UE, a medium access control (MAC) control element (CE) from a network base station, the MAC CE used to switch the cross-carrier scheduling primary cell. Another method includes performing switching off cross-carrier scheduling primary cell by a secondary cell for a UE, and restoring, by the UE, a factor in the primary cell for scheduling the primary cell, and/or restoring, by the UE, a non-fallback downlink control infor- (Continued)

mation (DCI) in the primary cell for scheduling the primary cell.

6 Claims, 7 Drawing Sheets

(56) References Cited

U.S. PATENT DOCUMENTS

| | | | | |
|---|---|---|---|---|
| 2017/0202025 | A1* | 7/2017 | Ouchi | H04W 72/0446 |
| 2019/0281585 | A1 | 9/2019 | Dinan | |
| 2020/0106592 | A1* | 4/2020 | Soriaga | H04L 5/0094 |
| 2020/0229081 | A1* | 7/2020 | Ang | H04B 7/06964 |
| 2020/0305183 | A1 | 9/2020 | Papasakellariou | |
| 2021/0100021 | A1* | 4/2021 | Xu | H04L 5/003 |
| 2021/0168774 | A1* | 6/2021 | Li | H04W 16/14 |
| 2021/0337577 | A1* | 10/2021 | Sun | H04W 72/1273 |
| 2021/0360616 | A1* | 11/2021 | Yi | H04L 5/0053 |
| 2022/0086894 | A1* | 3/2022 | Papasakellariou | H04L 5/0053 |
| 2022/0141851 | A1* | 5/2022 | Gross | H04W 28/0231 370/329 |
| 2022/0279453 | A1* | 9/2022 | Dinan | H04W 72/23 |
| 2023/0040333 | A1* | 2/2023 | Xu | H04L 5/0053 |
| 2023/0074086 | A1* | 3/2023 | Yi | H04L 1/1822 |

FOREIGN PATENT DOCUMENTS

| | | |
|---|---|---|
| RU | 2566670 C1 | 10/2015 |
| WO | WO 2013/009464 A1 | 1/2013 |

OTHER PUBLICATIONS

Extended European Search Report regarding EP 20 95 7113 dated Sep. 29, 2023, 11 pages.
NTT DOCOMO et al., "Offline summary for PDCCH structure and search space part 2," 3GPP Draft, R1-1811926 SUM A1_7.1.3.1 Search Space2_R3, 3rd Generation Partnership Project (3GPP), Mobile Competence Centre, 650, Route Des Lucioles, F-06921, Sophia-Antipolis Cedex, France, vol. RAN WG1, No. Chengdu, China; Oct. 8, 2018-Oct. 12, 2018 9 Oct. 9, 2018, pp. 1-66, XP051519250, Retrieved from the Internet: http://www.3gpp.org/ftp/tsg%5Fran/WG1 %5FRL1 /TSGR1 %5F94b/Docs/R1%2D1811926%2Ezip.
Japanese Office Action and English translation regarding Application No. 2023-512112 dated Mar. 5, 2024, 11 pages.
ETRI, "Discussion on cross-carrier scheduling for NR DSS," 3GPP TSG RAN WG1 #102-e R1-2006362, Retrieved from the internet: www.3gpp.org/ftp/tsg_ran/WG1_RL1/TSGR1102-e/Docs/R1-2006362.zip>, Aug. 7, 2020, 6 pages.
Qualcomm Incorporated, "Views on cross-carrier scheduling from an SCell to the PCell/PSCell," 3GPP TSG RAN WG1 #102-e, R1-2006833, Retrieved from the Internet: www.3gpp.org/ftp/tsg_ran/WG1_RL1/TSGR1_102-e/Docs/R1-2006833.zip>, Aug. 8, 2020, 6 pages.
First Chinese Office Action with English translation and Search Report regarding Application No. 202080103349.1 dated Aug. 1, 2024, 36 pages.
International Search Report and Written Opinion regarding PCT/CN2020/121142 dated Jul. 15, 2021.
Moderator (Ericsson), "Summary of NR Dynamic spectrum sharing (DSS) in Email discussion [102-e-NR-DSS-DC_enh2-01]," *3GPP TSG-RAN WGJ #102—e eMeeting*, R1-2007442, Aug. 28, 2020.
Russian Patent Office Office Action and Search Report with English Translation of the Official Action regarding Application No. 2023103829 dated Oct. 6, 2023, 13 pages.
European Patent Office Office action regarding 20 957 113.2 dated Mar. 12, 2025, 7 pages.
ZTE "PDCCH Blind Decoding and Search Space for Carrier Aggregation ofLTE-A", 3GPP TSG-RAN WG1 #60, R1-100958, Feb. 22, 2010, pp. 1-4, 4 pages Retrieved from the Internet: http://www.3gpp.org/ftp/tsg_ran/WG1_RL 1/TSGR1_ 60/Docs/.
Ericsson: "Summary of email discussion [96b-NR-11]," Discussion and Decision 3GPP Draft; R1-1905915_ 3GPP TSG-RAN WG1 Meeting 96bis, Xi'an, Chiina, Apr. 8-12, 2019, 7 pages.

* cited by examiner

400 receiving, by the UE, a downlink control information (DCI) via a physical downlink control channel (PDCCH) from a network base station, the DCI used to switch the cross-carrier scheduling primary cell    410 receiving, by the UE, a medium access control (MAC) control element (CE) from a network base station, the MAC CE used to switch the cross-carrier scheduling primary cell    710

800 in response to, within a time period of the timer, receiving a DCI on the secondary cell to cross-carrier scheduling the primary cell, resetting, by the UE, the timer
810

in response to passing the time period of the timer without receiving at least one DCI on the secondary cell to cross-carrier scheduling the primary cell, releasing, by the UE, the cross-carrier scheduling the primary cell by the secondary cell
820

FIG. 8

900 performing switching off cross-carrier scheduling primary cell by a secondary cell for a user equipment (UE)
910

restoring, by the UE, a factor in the primary cell for scheduling the primary cell
920

```
┌─────────────────────────────────────────────────────────────────────┐
│ performing switching off cross-carrier scheduling primary cell by a secondary cell for │
│                        a user equipment (UE)                        │
│                                                              1010   │
└─────────────────────────────────────────────────────────────────────┘
                                    │
                                    ▼
┌─────────────────────────────────────────────────────────────────────┐
│ restoring, by the UE, a non-fallback downlink control information (DCI) in the primary │
│                   cell for scheduling the primary cell              │
│                                                              1020   │
└─────────────────────────────────────────────────────────────────────┘
```

FIG. 10

METHOD AND DEVICE FOR CROSS-CARRIER SCHEDULING PRIMARY CELL

CROSS-REFERENCE TO RELATED APPLICATION

This application is a continuation application of PCT International Patent Application No. PCT/CN2020/121142, filed with the China National Intellectual Property Administration, PRC on Oct. 15, 2020, which is herein incorporated by reference in its entirety.

TECHNICAL FIELD

The present disclosure is directed generally to wireless communications. Particularly, the present disclosure relates to methods and devices for a physical downlink control channel (PDCCH) of a secondary cell (SCell) scheduling a physical downlink shared channel (PDSCH) or physical uplink shared channel (PUSCH) on a primary cell (PCell) or a primary secondary cell (PSCell).

BACKGROUND

Wireless communication technologies are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users.

For the 5th Generation mobile communication technology, a primary cell may schedule a secondary cell. There are some issues and/or problems associated with the existing systems. One issue/problem may include that physical downlink control channel (PDCCH) of a primary cell may schedule physical downlink shared channel (PDSCH) or physical uplink shared channel (PUSCH) on a secondary cell, but there are problems/issues with a PDCCH of a secondary cell scheduling PDSCH or PUSCH on a primary cell. The present disclosure may address at least some of issues associated with the existing system to improve the performance of the wireless communication. Another issue/problem may include that, considering dynamic spectrum sharing (DSS) in recent development in wireless communication technology, a resource of a PDCCH of a primary cell may be restricted/limited. To mitigate the restricted/limited PDCCH resource of a primary cell and/or to offload the PDCCH transmission on the primary cell, the present disclosure present various embodiments for cross-carrier scheduling including a secondary cell scheduling a PDSCH or PUSCH of a primary cell.

SUMMARY

This document relates to methods, systems, and devices for wireless communication, and more specifically, for a physical downlink control channel (PDCCH) of a secondary cell (SCell) scheduling a physical downlink shared channel (PDSCH) or physical uplink shared channel (PUSCH) on a primary cell (PCell) or a primary secondary cell (PSCell).

In one embodiment, the present disclosure describes a method for wireless communication. The method includes switching cross-carrier scheduling primary cell for a user equipment (UE), wherein a secondary cell is configured to schedule the primary cell, by receiving, by the UE, a downlink control information (DCI) via a physical downlink control channel (PDCCH) from a network base station, the DCI used to switch the cross-carrier scheduling primary cell.

In another embodiment, the present disclosure describes a method for wireless communication. The method includes switching cross-carrier scheduling primary cell for a user equipment (UE), wherein a secondary cell is configured to schedule the primary cell, by receiving, by the UE, a medium access control (MAC) control element (CE) from a network base station, the MAC CE used to switch the cross-carrier scheduling primary cell.

In another embodiment, the present disclosure describes a method for wireless communication. The method includes switching cross-carrier scheduling primary cell for a user equipment (UE) by a timer, wherein a secondary cell is configured or activated to schedule the primary cell, comprising: in response to, within a time period of the timer, receiving a DCI on the secondary cell to cross-carrier scheduling the primary cell, resetting, by the UE, the timer; and in response to passing the time period of the timer without receiving at least one DCI on the secondary cell to cross-carrier scheduling the primary cell, releasing, by the UE, the cross-carrier scheduling the primary cell by the secondary cell.

In another embodiment, the present disclosure describes a method for wireless communication. The method includes performing switching off cross-carrier scheduling primary cell by a secondary cell for a user equipment (UE); and restoring, by the UE, a factor in the primary cell for scheduling the primary cell.

In another embodiment, the present disclosure describes a method for wireless communication. The method includes performing switching off cross-carrier scheduling primary cell by a secondary cell for a user equipment (UE); and restoring, by the UE, a non-fallback downlink control information (DCI) in the primary cell for scheduling the primary cell.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 8 shows a flow diagram of a method for wireless communication.

FIG. 9 shows a flow diagram of a method for wireless communication.

FIG. 10 shows a flow diagram of a method for wireless communication.

DETAILED DESCRIPTION

Figure 1:
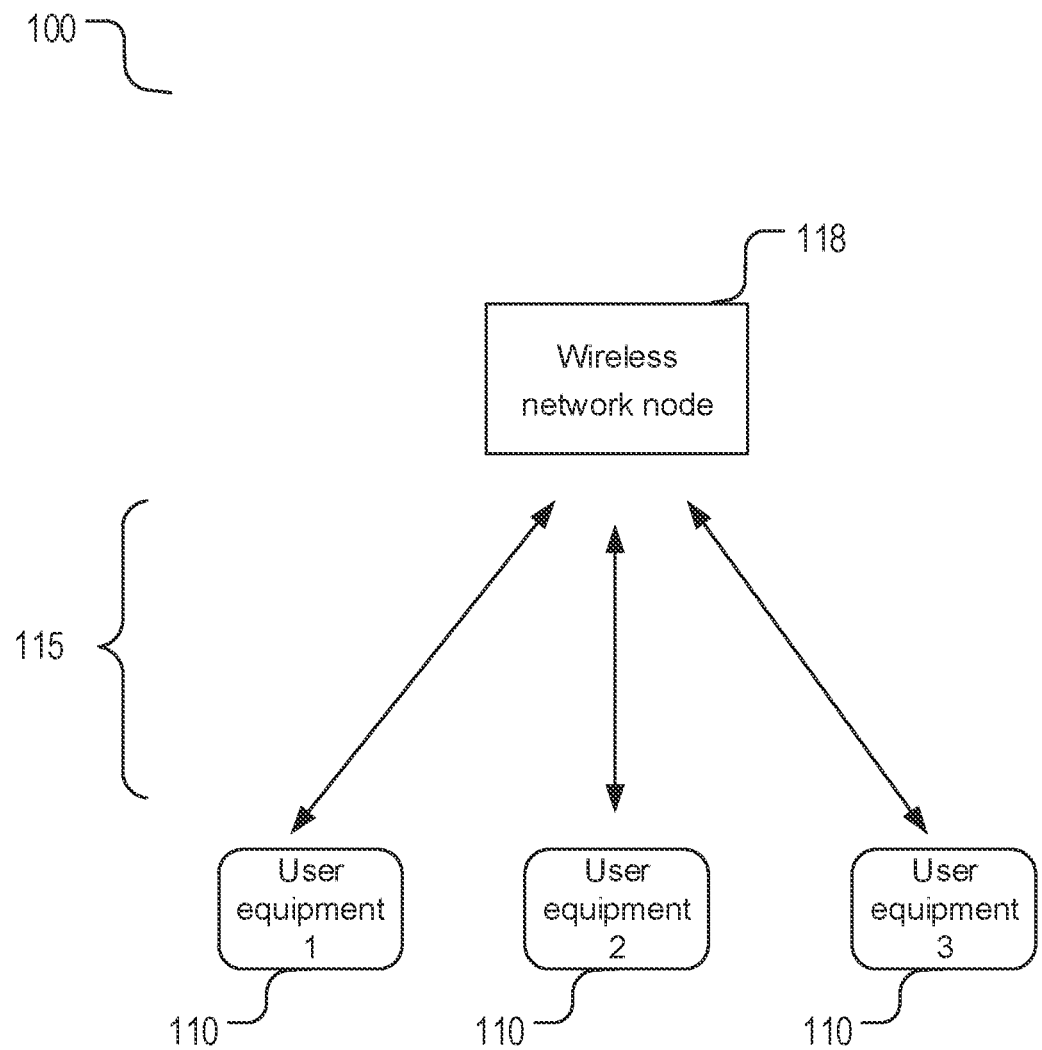
FIG. 1 shows an example of a wireless communication system include one wireless network node and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for scheduling one or more cells with single downlink control information (DCI).

New generation (NG) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users.

The 4th Generation mobile communication technology (4G) Long-Term Evolution (LTE) or LTE-Advance (LTE-A) and the 5th generation mobile communication technology (5G) face more and more demands. Based on the developing trend, 4G and 5G systems may develop supports on features of enhanced mobile broadband (eMBB), ultra-reliable low-latency communication (URLLC), and massive machine-type communication (mMTC). Some spectrum used for 4G may be reused for 5G according to dynamic spectrum sharing (DSS).

In the 5G communication system, a secondary serving cell (SCell) may be the only scheduling cell or scheduled cell, while a primary cell (PCell) or a primary secondary cell (PSCell) may be a scheduling cell and may not be a scheduled cell. The primary secondary cell (PSCell) may be a primary cell in a secondary cell group (SCG). Some issues and/or problems associated with the current system. One issue/problem may include that a physical downlink control channel (PDCCH) of PCell/PSCell may schedule physical downlink shared channel (PDSCH) or physical uplink shared channel (PUSCH) on SCell, but PDSCH or PUSCH on PCell/PSCell may not be scheduled by PDCCH of SCell. Considering DSS in NR communication system, a resource of PDCCH of PCell/PSCell may be restricted.

The present disclosure describes various embodiments including NR PDCCH enhancements for cross-carrier scheduling including PDCCH of SCell scheduling PDSCH or PUSCH of PCell/PSCell at least to mitigate the restricted/limited PDCCH resource PCell/PSCell and/or to offload the data transmission on PDCCH of PCell/PSCell. When a capability restriction of PDCCH of PCell/PSCell changes dynamically, the various embodiments described in the present disclosure support dynamic switching cross-carrier scheduling primary cell by a secondary cell.

FIG. 1 shows a wireless communication system 100 including a wireless network node 118 and one or more user equipment (UE) 110. The wireless network node may include a network base station, which may be a nodeB (NB, e.g., a gNB) in a mobile telecommunications context. Each of the UE may wirelessly communicate with the wireless network node via one or more radio channels 115. For example, a first UE 110 may wirelessly communicate with a wireless network node 118 via a channel including a plurality of radio channels during a certain period of time. The network base station 118 may send high layer signaling to the UE 110. The high layer signaling may include configuration information for communication between the UE and the base station. In one implementation, the high layer signaling may include a radio resource control (RRC) message.

Figure 2:
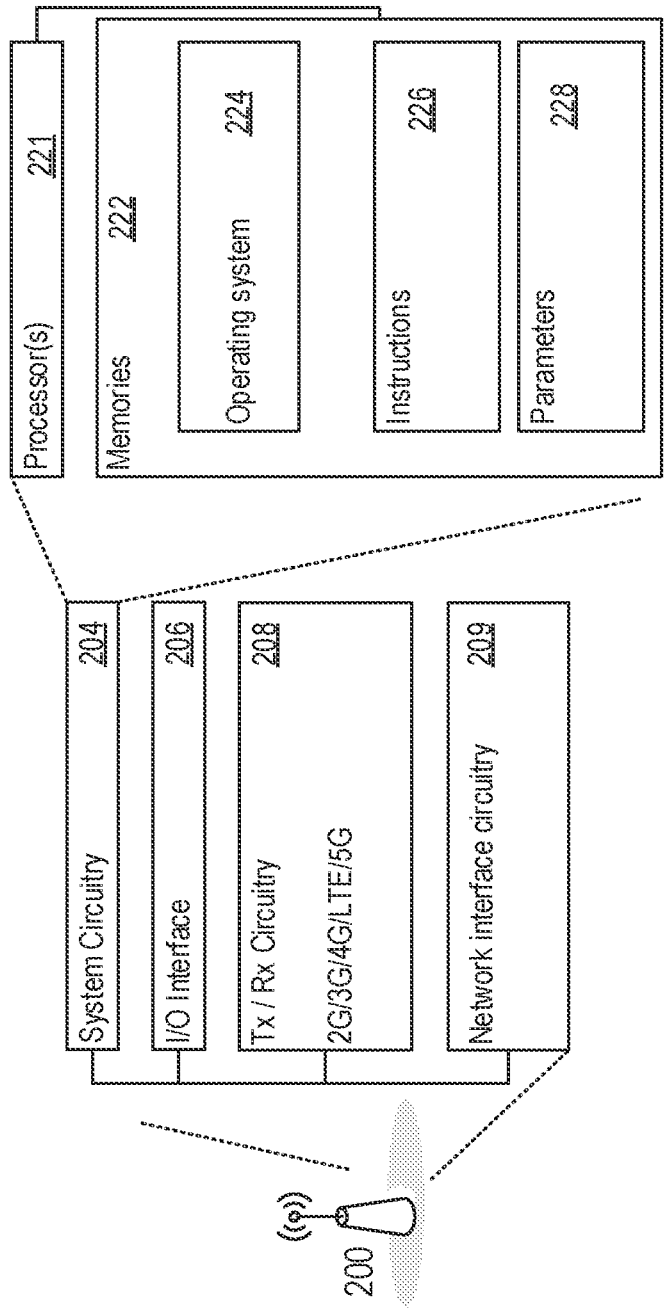
FIG. 2 shows an example of a network node.

FIG. 2 shows an example of electronic device 200 to implement a network base station. The example electronic device 200 may include radio transmitting/receiving (Tx/Rx) circuitry 208 to transmit/receive communication with UEs and/or other base stations. The electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the network node. The parameters 228 may include parameters to support execution of the instructions 226. For example, parameters may include network protocol settings, bandwidth parameters, radio frequency mapping assignments, and/or other parameters.

Figure 3:
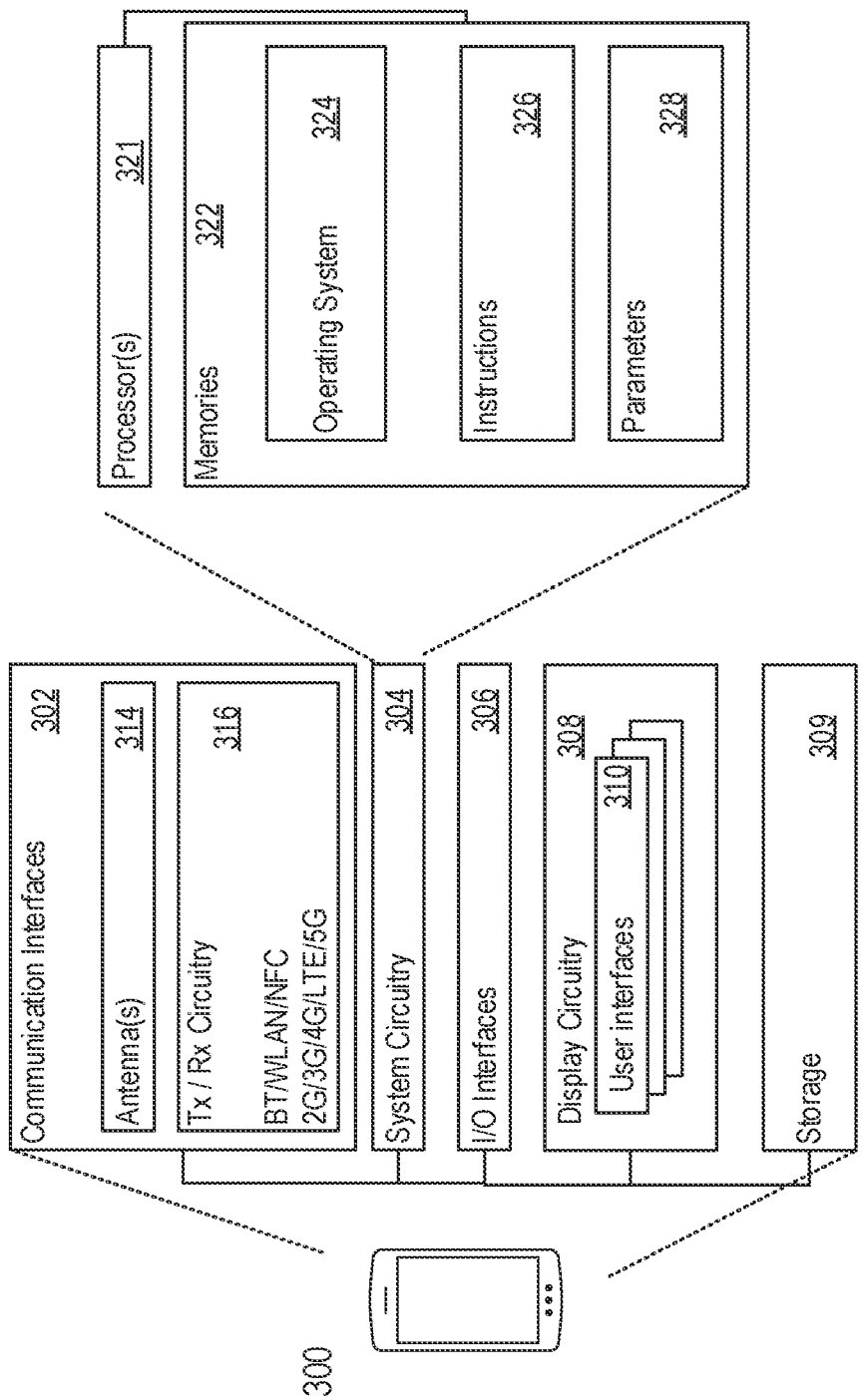
FIG. 3 shows an example of a user equipment.

FIG. 3 shows an example of an electronic device to implement a terminal device 300 (for example, user equipment (UE)). The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several below embodiments, which may be implemented, partly or totally, on the network base station and/or the user equipment described above in FIGS. 2-3.

Figures 4, 5:
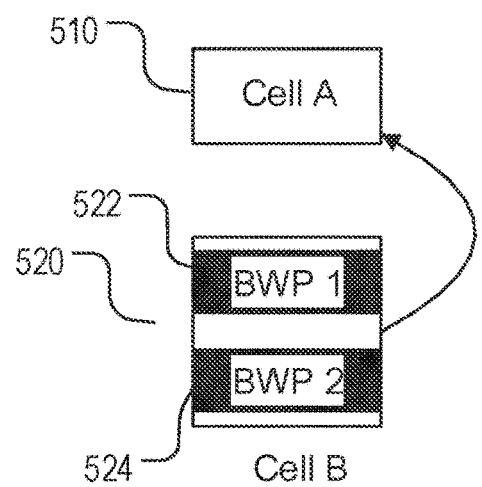
FIG. 4 shows a flow diagram of a method for wireless communication.
FIG. 5 shows a schematic diagram of an exemplary embodiment for wireless communication.

Referring to FIG. 4, the present disclosure describes embodiments of a method 400 for switching cross-carrier scheduling primary cell for a user equipment (UE), wherein a secondary cell is configured to schedule the primary cell. The method 400 may include step 410: receiving, by the UE, a downlink control information (DCI) via a physical downlink control channel (PDCCH) from a network base station, the DCI used to switch the cross-carrier scheduling primary cell. In one implementation, the cross-carrier scheduling primary cell comprises PDCCH of a secondary cell (SCell) scheduling a physical shared channel on the primary cell. The primary cell may include at least one of a primary cell in a master cell group (PCell), or a primary cell in a secondary cell group (PSCell). The physical shared channel on the primary cell comprises at least one of a physical downlink shared channel (PDSCH), or a physical uplink shared channel (PUSCH) on the primary cell.

The present disclosure describes various embodiments of using a bandwidth part (BWP) to support dynamic switching of the cross-carrier scheduling primary cell by a secondary cell. In carrier aggregation (CA) scenario, a primary cell (e.g., PCell or PSCell) may be configured to be scheduled by a secondary cell (e.g., SCell). In one implementation, the secondary cell is configured as a scheduling cell to schedule itself, and also configured to support scheduling the primary cell.

The various embodiments described in the present disclosure improve the wireless communication technology, addressing at least some of the problems/issues with previous systems, leading to benefits. For example, in one embodiment, multiple BWPs are configured to support or not support the cross-carrier scheduling primary cell combined with BWP switching indication, or all of them support the cross-carrier scheduling primary cell together with BWP switching indication and indicate whether the BWP supports SCell-schedule-PCell, to achieve dynamic support of the cross-carrier scheduling primary cell. This may ensure that the change of PDCCH capacity can be flexibly adapted when the SCell supports the scheduling of the PCell/PSCell. Dynamic release of the cross-carrier scheduling primary cell may reduce the complexity of blind detection and save the power consumption of UEs.

In one implementation of the various embodiments, at least two BWPs are configured in a secondary cell. A search space index configured for one BWP of the secondary cell is different from a search space index configured for one BWP of the primary cell. At least one search space index configured in other BWP of the secondary cell is same as a search space index configured for one BWP of the primary cell. The active BWP of the secondary cell is dynamically indicated by a DCI to dynamically support the cross-carrier scheduling primary cell.

The secondary cell may be configured to support the cross-carrier scheduling primary cell. The primary cell may be configured with a bandwidth part (BWP) having a search space index. The secondary cell is configured with a first BWP having a first search space index, and the first search space index of the first BWP is same with the search space index of the BWP in the primary cell; and the secondary cell is also configured with a second BWP having a second search space index, and the second search space index of the second BWP is different from the search space index of the BWP in the primary cell. The DCI comprises a bandwidth part indicator. The bandwidth part indicator may be used to indicate which BWP is active for the cross-carrier scheduling primary cell by a secondary cell. For example but not limited to, a field size of the bandwidth part indicator is configured as 1 bit, the bandwidth part indicator of "0" may be used to indicate that the first BWP is active for the cross-carrier scheduling primary cell by a secondary cell; and the bandwidth part indicator of "1" may be used to indicate that the second BWP is active for the cross-carrier scheduling primary cell by a secondary cell. In response to the bandwidth part indicator indicating the first BWP being active, the cross-carrier scheduling the primary cell by the secondary cell is switched on; and in response to the bandwidth part indicator indicating the second BWP being active, the cross-carrier scheduling the primary cell by the secondary cell is switched off.

For example referring to FIG. 5, cell A 510 is a primary cell and is configured with search space index={0, 1, 2, 3, 10, 11, 12, and 13} in a BWP. Cell B 520 is a secondary cell, and the configuration of cell B 520 supports the cross-carrier scheduling of cell A 510. Cell B 520 is configured with search space index={0, 1, 2, and 3} in a first BWP (BWP1) 522, and a search space index={20, 21, 22, and 23} in a second BWP (BWP2) 524. When the bandwidth part indicator in the DCI used for cross-carrier scheduling primary cell by the secondary cell indicates that active BWP is BWP1, the cross-carrier scheduling primary cell by the secondary cell is supported because cell B is configured to support cross-carrier scheduling cell A and the same search space index are provided. When the bandwidth part indicator in DCI indicating that active BWP is BWP2, even though that cell B is configured to support cross-carrier scheduling cell A, due to not having the same search space index, the cross-carrier scheduling primary cell is not supported.

In another implementation of the various embodiments, at least two BWPs are configured in the secondary cell, and each BWP is configured whether the each BWP supports the cross-carrier scheduling primary cell. The active BWP of the secondary cell is dynamically indicated to the BWP with supporting the cross-carrier scheduling primary cell or the BWP without supporting the cross-carrier scheduling primary cell to dynamically support the cross-carrier scheduling primary cell.

The primary cell is configured with a bandwidth part (BWP) having a search space index. The secondary cell is configured with a first BWP having a first search space index, and the first BWP is configured to support the cross-carrier scheduling; and the secondary cell is configured with a second BWP having a second search space index, the second BWP configured not to support the cross-carrier scheduling. The DCI may include a bandwidth part indicator. The bandwidth part indicator may be used to indicate which BWP is active to be used by a secondary cell. For example but not limited to, a field size of the bandwidth part indicator is configured as 1 bit, the bandwidth part indicator of "0" may be used to indicate that the first BWP is active; and the bandwidth part indicator of "1" may be used to indicate that the second BWP is active for the cross-carrier scheduling primary cell by a secondary cell. In response to the bandwidth part indicator indicating a first BWP being active, the cross-carrier scheduling the primary cell by the secondary cell is dynamically switched on; and in response to the bandwidth part indicator indicating a second BWP being active, the cross-carrier scheduling the primary cell by the secondary cell is dynamically switched off.

For example but not limited to, the configuration of a secondary cell (cell B) may support cross-carrier scheduling primary cell (cell A). Cell A is configured with search space index={0, 1, 2, 3, 10, 11, 12, and 13} in a BWP. Cell B is configured with a search space index={0, 1, 2, and 3} in a first BWP (BWP1), and a search space index={10, 11, 12, and 13} in a second BWP (BWP2). The BWP1 is configured to support the cross-carrier scheduling the primary cell by the secondary cell (also referred as SCell-schedule-PCell). The BWP2 is configured not to support the cross-carrier scheduling the primary cell by the secondary cell. When the bandwidth part indicator in the DCI used for the secondary cell scheduling indicates that BWP1 is the active BWP, the cross-carrier scheduling the primary cell by the secondary cell is supported because cell B is configured to support cross-carrier scheduling cell A and the same search space index can be provided and the BWP1 is configured to support SCell-schedule-PCell. When the bandwidth part indicator in the DCI indicates that the BWP2 is the active BWP, even that cell B is configured to support cross-carrier scheduling cell A and the same search space index can be provided, due to that the BWP2 is configured not to support SCell-schedule-PCell, SCell-schedule-PCell is not supported.

In another implementation of the various embodiments, at least two BWPs are configured in the secondary cell. The DCI indicates which BWP of the secondary cell is active, and whether the BWP of the secondary cell supports the cross-carrier scheduling primary cell. Thus, the active BWP of the secondary cell is dynamically indicated by the DCI and whether the BWP supports SCell-schedule-PCell or not is also dynamically indicated by the DCI, so as to dynamically support the cross-carrier scheduling primary cell.

The DCI may include a bandwidth part indicator including a cross-carrier scheduling primary cell indicator. The bandwidth part indicator may be used to indicate which BWP is active to be used by a secondary cell. For example but not limited to, a field size of the bandwidth part indicator including a cross-carrier scheduling primary cell indicator is configured as 2 bits, the first bit represent bandwidth part indicator which indication of "0" may be used to indicate that the first BWP is active; and the bandwidth part indicator of "1" may be used to indicate that the second BWP is active. The cross-carrier scheduling primary cell indicator may be used to indicate whether the secondary cell activate or release the cross-carrier scheduling primary cell. For example but not limited to, the second bit represents cross-carrier scheduling primary cell indicator which indication of "0" may be used to indicate that the release of the cross-carrier scheduling primary cell; and the cross-carrier scheduling primary cell indicator of "1" may be used to indicate that the activation of the cross-carrier scheduling primary cell indicator. In response to the bandwidth part indicator indicating a BWP being active and the cross-carrier scheduling primary cell indicator indicating an activation of the cross-carrier scheduling primary cell, the cross-carrier scheduling the primary cell by the secondary cell is dynamically switched on; and in response to the bandwidth part indicator indicating a BWP being active and the cross-carrier scheduling primary cell indicator indicating a release of the cross-carrier scheduling primary cell, the cross-carrier scheduling the primary cell by the secondary cell is dynamically switched off.

For example but not limited to, the configuration of a secondary cell (cell B) supports cross-carrier scheduling of a primary cell (Cell A). The Cell A is configured with a search space index={0, 1, 2, 3, 10, 11, 12, and 13} in a BWP. The Cell B is configured with a search space index={0, 1, 2, and 3} in a first BWP (BWP1), and a search space index={10, 11, 12, and 13} in a second BWP (BWP2). When the bandwidth part indicator in the DCI used for the secondary cell scheduling indicates that active BWP is BWP1, the cross-carrier scheduling primary cell (also referred to as SCell-schedule-PCell) is supported because cell B is configured to support cross-carrier scheduling cell A and the same search space index can be provided and the cross-carrier scheduling primary cell indicator indicates to support SCell-schedule-PCell. When the bandwidth part indicator in the DCI indicating that the active BWP is BWP2, even that cell B is configured to support cross-carrier scheduling cell A and the same search space index can be provided, due to that the cross-carrier scheduling primary cell indicator indicates not to support SCell-schedule-PCell, SCell-schedule-PCell is not supported.

In another implementation of the various embodiments, at least two BWPs are configured in the secondary cell. The two BWPs are non-dormant BWPs. One non-dormant BWP is configured to supports the cross-carrier scheduling primary cell by a secondary cell; and the other non-dormant BWP is configured not to support the cross-carrier scheduling primary cell by a secondary cell. When a SCell dormancy indicator in the DCI is used, it indicates a non-dormant BWP to support the cross-carrier scheduling primary cell by a secondary cell or a non-dormant BWP not to support the cross-carrier scheduling primary cell by a secondary cell.

The secondary cell may be configured with a first non-dormant BWP to support the cross-carrier scheduling primary cell and the secondary cell is configured with a second non-dormant BWP not to support the cross-carrier scheduling primary cell. The DCI comprises a SCell dormancy indicator. The SCell dormancy indicator may be used to indicate which BWP is active to be used by a secondary cell. For example but not limited to, a field size of the SCell dormancy indicator is configured as 2 bits, the second bit of SCell dormancy indicator which indication of "0" may be used to indicate that the first non-dormant BWP is active; and the SCell dormancy indicator of "1" may be used to indicate that the second non-dormant BWP is active. In response to the SCell dormancy indicator indicating to use the first non-dormant BWP being active, the cross-carrier scheduling the primary cell by the secondary cell is dynamically switched on; in response to the SCell dormancy indicator indicating to use the second non-dormant BWP being active, the cross-carrier scheduling the primary cell by the secondary cell is dynamically switched off.

For one example, the configuration of a secondary cell (cell B) may support cross-carrier scheduling of a primary cell (cell A). Cell A is configured with a search space index={0, 1, 2, 3, 10, 11, 12, and 13} in a BWP. Cell B is configured with a search space index={0, 1, 2, and 3} in a first non-dormant BWP (BWP1), and a search space index={10, 11, 12, and 13} in a second dormant BWP (BWP2), and a dormant BWP3. BWP1 is configured to support the cross-carrier scheduling the primary cell by the secondary cell (also referred as SCell-schedule-PCell), BWP2 is configured not to support SCell-schedule-PCell. In one implementation, when the SCell dormancy indicator indicates BWP1, SCell-schedule-PCell is supported because cell B is configured to support cross-carrier scheduling cell A and the same search space index can be provided and BWP1 is configured to support SCell-schedule-PCell. When the SCell dormancy indicator indicates BWP2, even that cell B is configured to support cross-carrier scheduling cell A and the same search space index can be provided, due to that BWP2 is configured not to support SCell-schedule-PCell, SCell-schedule-PCell is not supported. Alternatively in another implementation, when the first bit of a SCell dormancy indicator in the DCI used for SCell scheduling indicates '0' value, SCell dormancy indicator indicates switching to the dormant BWP3. When the SCell dormancy indicator in the DCI used for SCell scheduling indicates '1' value, the SCell dormancy indicator indicates switching to the non-dormant BWP, and further the second bit of a SCell dormancy indicator indicates the index of non-dormant BWP. When the second bit of the SCell dormancy indicator indicates BWP1, SCell-schedule-PCell is supported because cell B is configured to support cross-carrier scheduling cell A and the same search space index can be provided and BWP1 is configured to support SCell-schedule-PCell. When the second bit of the SCell dormancy indicator indicates BWP2, even that cell B is configured to support cross-carrier scheduling cell A and the same search space index can be provided, due to that BWP2 is configured not to support SCell-schedule-PCell, SCell-schedule-PCell is not supported.

In another implementation of the various embodiments, at least two BWPs are configured in the secondary cell, one of the BWPs is a non-dormant BWP, the other one of the BWPs is a dormant BWP. When a SCell dormancy indication in the DCI is used to indicate the non-dormant BWP, it also indicates whether the non-dormant BWP supports the cross-carrier scheduling primary cell by a secondary cell or not.

The DCI may include a SCell dormancy indicator including a cross-carrier scheduling primary cell indicator. The SCell dormancy indicator may be used to indicate whether the dormant BWP or the non-dormant BWP is active to be used by a secondary cell. For example but not limited to, a field size of the SCell dormancy indicator including a cross-carrier scheduling primary cell indicator is configured as 2 bits, the first bit of the SCell dormancy indicator which indication of "0" may be used to indicate that the dormant BWP is active; and the SCell dormancy indicator of "1" may be used to indicate that the non-dormant BWP is active. The cross-carrier scheduling primary cell indicator may be used to indicate whether the secondary cell activate or release the cross-carrier scheduling primary cell. For example but not limited to, the second bit of the SCell dormancy indicator is the cross-carrier scheduling primary cell indicator which indication of "0" may be used to indicate that the release of the cross-carrier scheduling primary cell; and the cross-carrier scheduling primary cell indicator of "1" may be used to indicate that the activation of the cross-carrier scheduling primary cell indicator. In response to the SCell dormancy indicator indicating to use a non-dormant BWP and the cross-carrier scheduling primary cell indicator indicating an activation of the cross-carrier scheduling primary cell, the cross-carrier scheduling the primary cell by the secondary cell is dynamically switched on; and in response to the SCell dormancy indicator indicating to use a non-dormant BWP and the cross-carrier scheduling primary cell indicator indicating a release of the cross-carrier scheduling primary cell, the cross-carrier scheduling the primary cell by the secondary cell is dynamically switched off.

For one example, the configuration of a secondary cell (cell B) supports cross-carrier scheduling of a primary cell (cell A). Cell A is configured with a search space index={0, 1, 2, 3, 10, 11, 12, and 13} in a BWP. Cell B is configured with a search space index={0, 1, 2, and 3} in a non-dormant BWP (BWP1), and a dormant BWP (BWP2). When a SCell dormancy indicator in the DCI used for SCell scheduling indicates '0' value, the SCell dormancy indicator indicates switching to the dormant BWP2. When the SCell dormancy indicator in the DCI used for SCell scheduling indicates '1' value, the SCell dormancy indicator indicates switching to the non-dormant BWP1. The SCell dormancy indicator in the DCI may include a cross-carrier scheduling primary cell indicator which may indicate whether the non-dormant BWP1 supports the cross-carrier scheduling the primary cell by the secondary cell or not. When the SCell dormancy indicator in the DCI used for SCell scheduling indicates '1' value and also indicate to support the cross-carrier scheduling the primary cell by the secondary cell (also referred to as SCell-schedule-PCell), SCell-schedule-PCell is supported because cell B is configured to support cross-carrier scheduling cell A and the same search space index can be provided. When the SCell dormancy indicator in the DCI used for SCell scheduling indicates '1' value but indicate not support SCell-schedule-PCell, SCell-schedule-PCell is not supported although cell B is configured to support cross-carrier scheduling cell A and the same search space index can be provided.

In another implementation of the various embodiments, dynamic cross-carrier scheduling the primary cell by the secondary cell may be supported by a DCI with indication of activation or release of the cross-carrier scheduling the primary cell by the secondary cell. A non-fallback DCI including a field indicating a configuration of activation/release of the cross-carrier scheduling the primary cell by the secondary cell may be used to indicate whether to support the cross-carrier scheduling the primary cell by the secondary cell dynamically.

The DCI comprises a non-fallback DCI comprising a configurable field indicating the cross-carrier scheduling primary cell. When configured, the field may be used to indicate whether the secondary cell activate or release the cross-carrier scheduling primary cell. For example but not limited to, the field of "0" may be used to indicate that the release of the cross-carrier scheduling primary cell; and the field of "1" may be used to indicate that the activation of the cross-carrier scheduling primary cell indicator. In one implementation, the field may be a SCell-schedule-PCell field. In response to the field in the non-fallback DCI indicating an activation of the cross-carrier scheduling primary cell, the cross-carrier scheduling the primary cell by the secondary cell is switched on; and in response to the field in the non-fallback DCI indicating a release of the cross-carrier scheduling primary cell, the cross-carrier scheduling the primary cell by the secondary cell is switched off.

Optionally in one implementation, an effective time point for switching on or off the cross-carrier scheduling primary cell by the secondary cell includes at least one of the following: a first time based on a time of receiving the DCI and an offset value; and a second time based on a time of the physical shared channel scheduled by the DCI and the offset value. The offset value is an integer being equal to or greater than zero; and the offset value indicates an offset period determined by multiplying the integer with at least one of the following: an absolute time interval, an orthogonal frequency-division multiplexing (OFDM) symbol, or a slot.

For one example, the configuration of a secondary cell (cell B) supports cross-carrier scheduling of a primary cell (cell A). Cell A is configured with a search space index={0, 1, 2, 3, 10, 11, 12, and 13} in a BWP, and an activation/release of SCell-schedule-PCell field is configured in non-fallback DCI (e.g., DCI format 0_1/1_1) in at least one search space. Cell B is configured with a search space index={0, 1, 2, and 3} in BWP1 which is also configured with support of SCell-schedule-PCell. When the activation/release of SCell-schedule-PCell field in the non-fallback DCI indicates release of SCell-schedule-PCell, SCell-schedule-PCell is not supported although cell B is configured to support cross-carrier scheduling cell A and the same search space index can be provided. When the activation/release of SCell-schedule-PCell field in the non-fallback DCI indicates activation of SCell-schedule-PCell, SCell-schedule-PCell is supported because cell B is configured to support cross-carrier scheduling cell A and the same search space index can be provided.

For another example, the effective time of the activation/release SCell-schedule-PCell may be any one of the following time based on an offset value: (1) the offset value plus the slot/symbol #n of reception of the DCI with indication of activation/release SCell-schedule-PCell; or (2) the offset value plus the slot/symbol #n of the PDSCH/PUSCH scheduled by the DCI with indication of activation/release SCell-schedule-PCell. The offset value is an integer equal to or greater than 0, which may represent by one of the following: the offset value multiplied with an absolute time interval, the offset value multiplied with an OFDM symbol, or the offset value multiplied with a slot or sub-slot.

In another implementation of the various embodiments, dynamic cross-carrier scheduling the primary cell by the secondary cell may be supported by a DCI with indication of activation or release of the cross-carrier scheduling the primary cell by the secondary cell. The DCI may be a fallback DCI indicating whether to support the cross-carrier scheduling the primary cell by the secondary cell. The fallback DCI may include an indicator, which may include one of the following: a cyclic redundancy check (CRC) scrambled by a specific radio network temporary identifier (RNTI); at least one reserved bit in the fallback DCI; and a short message in the fallback DCI.

The DCI may include a fallback DCI comprising an indicator indicating the cross-carrier scheduling primary cell. For example but not limited to, the indicator of "0" may be used to indicate that the release of the cross-carrier scheduling primary cell; and the indicator of "1" may be used to indicate that the activation of the cross-carrier scheduling primary cell indicator. In response to the indicator in the fallback DCI indicating an activation of the cross-carrier scheduling primary cell, the cross-carrier scheduling the primary cell by the secondary cell is dynamically switched on; and in response to the indicator in the fallback DCI indicating a release of the cross-carrier scheduling primary cell, the cross-carrier scheduling the primary cell by the secondary cell is dynamically switched off. Optionally, the indicator in the fallback DCI comprises at least one of the following: a cyclic redundancy check (CRC) scrambled by a specific radio network temporary identifier (RNTI); at least one reserved bit in the fallback DCI; and a short message in the fallback DCI.

For example, when the DCI may have a format of DCI Format 1_0 with CRC scrambled by system information RNTI (SI-RNTI), paging RNTI (P-RNTI), random access RNTI (RA-RNTI), MsgB-RNTI, or scrambled by cell RNTI (C-RNTI). The "Frequency domain resource assignment" field of the DCI may include all ones, and 1 bit in reserved bit to indicate SCell-schedule-PCell activation/release. In one implementation, when the DCI may have a format of DCI format 1_0 or DCI format 0_0 used for unicast scheduling, a RNTI with specific value to scramble CRC may indicate SCell-schedule-PCell activation/release. In another implementation, when short messages indicator indicates only short message present in the DCI or both scheduling information and short message are present in the DCI, short messages may be used to indicate SCell-schedule-PCell activation/release.

In another implementation of the various embodiments, dynamic cross-carrier scheduling the primary cell by the secondary cell may be supported by a DCI with indication of activation or release of the cross-carrier scheduling the primary cell by the secondary cell. A blind decoding/control channel element (BD/CCE) scaling factor (or a cell weight factor) of the two scheduling cells of the PCell may be configured to implicitly indicate activation/release of the cross-carrier scheduling the primary cell by the secondary cell.

The DCI may include a factor indicating the cross-carrier scheduling primary cell. The factor in the DCI may include one of the following: a blind decoding/control channel element (BD/CCE) scaling factor, or a cell weight factor. When the BD/CCE scaling factor between the PCell and the SCell is (1, 0), i.e., the BD/CCE of the PCell is 1 times that of the per cell, and the BD/CCE of the SCell is 0 times that of the per cell, a release of the cross-carrier scheduling primary cell is implied. Thus, when the factor in the DCI equals to (1, 0) for PCell and SCell respectively, the factor indicates the release of the cross-carrier scheduling primary cell. In response to the factor in the DCI indicating an activation of the cross-carrier scheduling primary cell, the cross-carrier scheduling the primary cell by the secondary cell is dynamically switched on; and in response to the factor in the DCI indicating a release of the cross-carrier scheduling primary cell, the cross-carrier scheduling the primary cell by the secondary cell is dynamically switched off.

For example, the BD/CCE scaling factors (or cell weight factors, representing the scheduled PCell number counted for its scheduling cell of the PCell and the SCell respectively) of the two scheduling cells of the PCell indicated in the DCI is configured. In one implementation referring to FIG. 6, a factor may include 2-bit value 612, representing a BD/CCE scaling factor between PCell and the SCell 614. The 2-bit value of "00" (621) represents a BD/CCE scaling factor of (0.33, 0.66); the 2-bit value of "01" (622) represents a BD/CCE scaling factor of (0.5, 0.5); the 2-bit value of "10" (623) represents a BD/CCE scaling factor of (0.66, 0.33); and the 2-bit value of "00" (624) represents a BD/CCE scaling factor of (1, 0). When the scaling factor of the BD/CCE of the PCell and SCell is (0.5, 0.5), the budget of the BD/CCE of the PCell for scheduling PCell is ½ times of the budget of the BD/CCE of the per cell, and the budget of the SCell for scheduling PCell is ½ times of the budget of the BD/CCE of the per cell. When the scaling factor between the PCell and the SCell BD/CCE is (1, 0), the BD/CCE of the PCell is 1 times that of the per cell, and the BD/CCE of the SCell is 0 times that of the per cell, which implicitly releases the SCell-schedule-PCell.

Optionally and/or alternatively in another implementation, the DCI may not need to indicate BWP switching. Optionally and/or alternatively in another implementation, the DCI may be transmitted on the primary cell.

The various embodiments described in the present disclosure improve the wireless communication technology, addressing at least some of the problems/issues with previous systems, leading to benefits. For example, in one embodiment, through explicitly or implicitly indicate activation/release SCell-schedule-PCell, dynamic support of SCell-schedule-PCell is achieved. This may ensure that the change of PDCCH capacity can be flexibly adapted when the SCell supports the scheduling of the PCell/PSCell. Dynamic release of the cross-carrier scheduling primary cell may reduce the complexity of blind detection and save the power consumption of UEs.

Figures 6, 7:
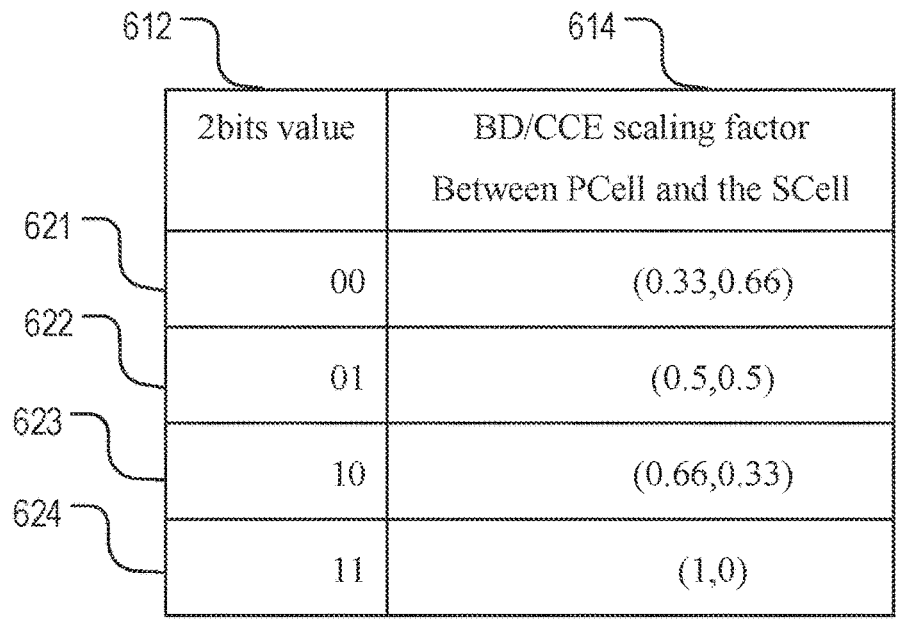
FIG. 6 shows an exemplary embodiment of a table in an exemplary embodiment for wireless communication.
FIG. 7 shows a flow diagram of a method for wireless communication.

Referring to FIG. 7, the present disclosure describes embodiments of a method 700 for switching cross-carrier scheduling primary cell for a user equipment (UE), wherein a secondary cell is configured to schedule the primary cell. The method 700 may include step 710: receiving, by the UE, a medium access control (MAC) control element (CE) from a network base station, the MAC CE used to switch the cross-carrier scheduling primary cell. In one implementation, the cross-carrier scheduling primary cell comprises PDCCH of a secondary cell (SCell) scheduling a physical shared channel on the primary cell. The primary cell may include at least one of a primary cell in a master cell group (PCell), or a primary cell in a secondary cell group (PSCell). The physical shared channel on the primary cell comprises at least one of a physical downlink shared channel (PDSCH), or a physical uplink shared channel (PUSCH) on the primary cell.

The present disclosure describes various embodiments for supporting dynamic SCell-schedule-PCell by MAC CE with indication of activation or release of SCell-schedule-PCell. In carrier aggregation (CA) scenario, a primary cell (e.g., PCell or PSCell) may be configured to be scheduled by a secondary cell (e.g., SCell). In one implementation, the secondary cell is configured as a scheduling cell to schedule itself, and also configured to support scheduling the primary cell.

The various embodiments described in the present disclosure improve the wireless communication technology, addressing at least some of the problems/issues with previous systems, leading to benefits. For example, in one embodiment, through independent MAC CE or joint coding with other MAC CE indicate activation/release SCell-schedule-PCell, dynamic support of SCell-schedule-PCell is achieved. This may ensure that the change of PDCCH capacity can be flexibly adapted when the SCell supports the scheduling of the PCell/PSCell. Dynamic release of the cross-carrier scheduling primary cell may reduce the complexity of blind detection and save the power consumption of UEs.

In one implementation of the various embodiments, MAC CE may be used to indicate activation/release SCell-schedule-PCell and the MAC CE may include a subheader has a specific logic channel identification (LCID). For example, the MAC CE comprises a specific MAC CE comprising a MAC subheader with a specific logic channel identification (LCID) indicating the cross-carrier scheduling primary cell. For example but not limited to, a field in the MAC CE of "0" may be used to indicate that the release of the cross-carrier scheduling primary cell; and the field in the MAC CE of "1" may be used to indicate that the activation of the cross-carrier scheduling primary cell indicator. In response to a field in the MAC CE indicating an activation of the cross-carrier scheduling primary cell, the cross-carrier scheduling the primary cell by the secondary cell is dynamically switched on; and in response to the field in the MAC CE indicating a release of the activation of the cross-carrier scheduling primary cell, the cross-carrier scheduling the primary cell by the secondary cell is dynamically switched off.

In another implementation of the various embodiments, joint coding with other MAC CE may be used to indicate to activation/release SCell-schedule-PCell. For example, one or more reserved bit in SCell activation/deactivation MAC CE is used to activate/release SCell-schedule-PCell, that is, to activate/release SCell-schedule-PCell while performing activation/deactivation SCell.

The MAC CE comprises a joint MAC CE comprising a reserved bit indicating the cross-carrier scheduling primary cell. Optionally and/or alternatively, the joint MAC CE comprises a SCell activation/deactivation MAC CE. For example but not limited to, the reserved bit in the MAC CE of "0" may be used to indicate that the release of the cross-carrier scheduling primary cell; and the reserved bit in the MAC CE of "1" may be used to indicate that the activation of the cross-carrier scheduling primary cell indicator. In response to the reserved bit indicating an activation of the cross-carrier scheduling primary cell, the cross-carrier scheduling the primary cell by the secondary cell is dynamically switched on; and in response to the reserved bit indicating a release of the activation of the cross-carrier scheduling primary cell, the cross-carrier scheduling the primary cell of the secondary cell is dynamically switched off.

Referring to FIG. 8, the present disclosure describes embodiments of a method 800 for switching cross-carrier scheduling primary cell for a user equipment (UE) by a timer, wherein a secondary cell is configured or activated to schedule the primary cell. The method 800 may include step 810: in response to, within a time period of the timer, receiving a DCI on the secondary cell to cross-carrier scheduling the primary cell, resetting, by the UE, the timer; and step 820: in response to passing the time period of the timer without receiving at least one DCI on the secondary cell to cross-carrier scheduling the primary cell, releasing, by the UE, the cross-carrier scheduling the primary cell by the secondary cell.

In one implementation, the cross-carrier scheduling primary cell comprises PDCCH of a secondary cell (SCell) scheduling a physical shared channel on the primary cell. The primary cell may include at least one of a primary cell in a master cell group (PCell), or a primary cell in a secondary cell group (PSCell). The physical shared channel on the primary cell comprises at least one of a physical downlink shared channel (PDSCH), or a physical uplink shared channel (PUSCH) on the primary cell.

In the previous embodiments, the cross-carrier scheduling the primary cell by the secondary cell (also referred as SCell-schedule-PCell) is dynamically supported. When the cross-carrier scheduling the primary cell by the secondary cell is released, deactivated, indicated to be dormant, or not supported, the BD/CCE budget scale factor (or cell weight factor) in the PCell for scheduling the PCell may be dynamically restored.

Referring to FIG. 9, the present disclosure describes various embodiments of a method 900 including a portion or all of the following steps: step 910: performing switching off cross-carrier scheduling primary cell by a secondary cell for a user equipment (UE); and step 920: restoring, by the UE, a factor in the primary cell for scheduling the primary cell. The factor in the primary cell comprises at least one of the following: a blind decoding/control channel element (BD/CCE) scaling factor; or a cell weight factor.

The various embodiments described in the present disclosure improve the wireless communication technology, addressing at least some of the problems/issues with previous systems, leading to benefits. For example, in one embodiment, when the SCell-schedule-PCell is deactivated or released, the BD/CCE budget scale factor (or cell weight factor) in the PCell for scheduling the PCell is dynamically restored. This may ensure that the change of PDCCH capacity may be flexibly adapted when the SCell supports the scheduling of the PCell. Restoring BD/CCE budget of PCell self-scheduling with dynamic release of SCell-schedule-PCell may keep scheduling flexibility unchanged.

In one implementation of the various embodiments, by adjusting the BD/CCE scaling factors (or cell weight factors) of the two scheduling cells of the PCell to implicitly indicate release SCell-schedule-PCell, the scaling factor of BD/CCE in the PCell for scheduling PCell is restored.

The UE may switch off the cross-carrier scheduling primary cell by the secondary cell in response to the factor is configured to (1, 0) for PCell and SCell respectively, indicating that the BD/CCE scaling factor is restored.

For one example, the BD/CCE scaling factors (or cell weight factors) of the two scheduling cells of the PCell are configured and indicated in the DCI. In one implementation, the BD/CCE scaling factors may be configured/fixed as 2-bit value as shown in FIG. 6. For example, when the 2-bit value is '01', the scaling factor of the BD/CCE of the PCell and SCell is (0.5, 0.5), which indicates that the budget of the BD/CCE of the PCell for scheduling PCell is ½ times of the budget of the BD/CCE of the per cell, and the budget of the SCell for scheduling PCell is ½ times of the budget of the BD/CCE of the per cell. When the 2-bit value indication is 11, the scaling factor between the PCell and the SCell BD/CCE is (1, 0), which indicates that the BD/CCE of the PCell is 1 times that of the per cell, and the BD/CCE of the SCell is 0 times that of the per cell, so as to implicitly release the SCell-schedule-PCell, which also means to restore the scaling factor of BD/CCE in the PCell for scheduling PCell.

In another implementation of the various embodiments, through the previous embodiments to release the SCell-schedule-PCell, the scaling factor of BD/CCE in the PCell for scheduling PCell may also be restored.

The UE may switch off the cross-carrier scheduling primary cell by the secondary cell, indicating that the BD/CCE scaling factor is restored to (1, 0) for PCell and SCell respectively.

For example, when dynamic SCell-schedule-PCell is not supported indicated by BWP switching, a DCI, or a MAC CE, the scaling factor of BD/CCE budget in the PCell for scheduling PCell may be implicitly restored, so as that the scaling factor of the PCell and SCell is (1, 0). Thus, the BD/CCE budget of the PCell is 1 times that of the per cell, and the BD/CCE budget of the SCell is 0 times that of the per cell, so as to release the SCell-schedule-PCell, which means to restore the scaling factor of BD/CCE budget in the PCell for scheduling PCell.

In the previous embodiments, the cross-carrier scheduling the primary cell by the secondary cell (also referred as SCell-schedule-PCell) is dynamically supported. When the cross-carrier scheduling the primary cell by the secondary cell is released, deactivated, indicated to be dormant, or not supported, the non-fallback DCI in the PCell for scheduling the PCell may be dynamically restored.

In some wireless systems, when working at the mode of SCell-schedule-PCell, only fallback DCI may be used for PCell self-scheduling, and only non-fallback DCI may be used for PCell PDSCH scheduling by SCell. Once the SCell-schedule-PCell is disabled or released dynamically, the PDSCH of the PCell may only be scheduled by fallback DCI in the PCell, thus the system efficiency will be reduced. Thus, it's beneficial to restore the non-fallback DCI in the PCell for scheduling the PCell.

Referring to FIG. 10, the present disclosure describes various embodiments of a method 1000 including a portion or all of the following steps: step 1010: performing switching off cross-carrier scheduling primary cell by a secondary cell for a user equipment (UE); and step 1020: restoring, by the UE, a non-fallback downlink control information (DCI) in the primary cell for scheduling the primary cell.

The various embodiments described in the present disclosure improve the wireless communication technology, addressing at least some of the problems/issues with previous systems, leading to benefits. For example, in one embodiment, when the SCell is deactivated or released, the non-fallback DCI on the PCell for scheduling the PCell is dynamically restored. This may ensure that the change of PDCCH capacity can be flexibly adapted when the SCell supports the scheduling of the PCell. Restoring a non-fallback DCI on a PCell for self-scheduling with dynamic release of SCell-schedule-PCell may keep scheduling flexibility unchanged.

In one implementation of the various embodiments, the primary cell may support a non-fallback DCI by switching to a BWP configured with a non-fallback DCI when SCell-schedule-PCell is disabled or released dynamically.

When the UE switches off the cross-carrier scheduling primary cell by the secondary cell, the UE may switch from a second BWP configured with a fallback DCI to a first BWP configured with the non-fallback DCI, restoring the non-fallback DCI in the primary cell for scheduling the primary cell. In one implementation, the primary cell may be configured with the first BWP having a first search space index, and the first BWP may be configured with the non-fallback DCI. The primary cell may be configured with the second BWP having a second search space index, and the second BWP may be configured with a fallback DCI.

For example, a secondary cell (Cell B) may be configured to support cross-carrier scheduling of a primary cell (Cell A). Cell A is configured with a search space index={0, 1, 2, 3} in a first BWP (BWP1) with a non-fallback DCI configured in a search space (SS) (e.g., SS #3), and configured with a search space index={10, 11, 12, 13} in a second BWP (BWP2) without a non-fallback DCI configured in any search space. Cell B is configured with search space index={0, 1, 2, and 3} in a first BWP (BWP1), and search space index={10, 11, 12, and 13} in a second BWP (BWP2). In case the active BWP of cell B is BWP2, the active BWP of cell A is BWP2, and supports SCell-schedule-PCell. When SCell-schedule-PCell is disabled or released dynamically (e.g., not to support SCell-schedule-PCell by BWP switching, or release SCell-schedule-PCell by DCI or MAC CE), the primary cell may work on BWP2 with only fallback DCI. At this time, non-fallback DCI can be supported on the primary cell by BWP switching to BWP1 of the primary cell.

In one implementation of the various embodiments, a non-fallback DCI may be implicitly activated by SCell-schedule-PCell is disabled or released, wherein, when SCell-schedule-PCell is enabled or activated, the non-fallback DCI configured in at least one search space in active BWP on the primary cell is disabled or released.

In response to the UE switching off the cross-carrier scheduling primary cell by the secondary cell, the UE enables the non-fallback DCI in a BWP, the non-fallback DCI in the primary cell for scheduling the primary cell may be restored. In one implementation, the primary cell may be configured with the BWP having a first search space index, and the BWP may be configured with non-fallback DCI. The non-fallback DCI may be disabled when the UE switches on the cross-carrier scheduling primary cell by the secondary cell.

For example, a secondary cell (cell B) may be configured to support cross-carrier scheduling of a primary cell (cell A). Cell A is configured with a search space index={0, 1, 2, 3} in a first BWP (BWP1) with a non-fallback DCI configured in a SS (e.g., SS #3). Cell B is configured with a search space index={0, 1, 2, and 3} in a first BWP (BWP1), and a search space index={10, 11, 12, and 13} in a second BWP (BWP2). In case the active BWP of cell B is BWP1, the active BWP of cell A is BWP1, with support of SCell-schedule-PCell and non-fallback DCI disabled. When SCell-schedule-PCell is disabled or released dynamically (e.g., not to support SCell-schedule-PCell by BWP switching, or release SCell-schedule-PCell by DCI or MAC CE), the primary cell works on BWP1 of the primary cell, which means that disabling or releasing SCell-schedule-PCell also implicitly enables non-fallback DCI in BWP1, so as to restore the support of non-fallback DCI on the primary cell.

The present disclosure describes methods, apparatus, and computer-readable medium for wireless communication. The present disclosure addressed the issues with scheduling a primary cell by a secondary cell. The methods, devices, and computer-readable medium described in the present disclosure may facilitate the performance of wireless transmission between a user equipment and a base station, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:
   determining a secondary cell (SCell) for cross-carrier scheduling a primary cell (PCell) to be deactivated or dormant for a user equipment (UE); and
   restoring, by the UE, a blind decoding/control channel element (BD/CCE) scaling factor of the primary cell scheduling from the primary cell.

2. The method according to claim 1, wherein:
   the BD/CCE scaling factor of the primary cell scheduling from the primary cell is restored to 1.

3. The method according to claim 2, wherein:
   the BD/CCE scaling factor of the primary cell scheduling from the SCell is restored to 0.

4. A wireless communication apparatus comprising:
   a processor and a memory, wherein the processor is configured to read code from the memory and implement:
   determining a secondary cell (SCell) for cross-carrier scheduling a primary cell (PCell) to be deactivated or dormant for the wireless communication apparatus; and
   restoring a blind decoding/control channel element (BD/CCE) scaling factor of the primary cell scheduling from the primary cell.

5. The wireless communication apparatus according to claim 4, wherein:
   the BD/CCE scaling factor of the primary cell scheduling from the primary cell is restored to 1.

6. The wireless communication apparatus according to claim 5, wherein:
   the BD/CCE scaling factor of the primary cell scheduling from the SCell is restored to 0.

* * * * *